(12) United States Patent
Matsumoto et al.

(10) Patent No.: US 11,536,321 B2
(45) Date of Patent: Dec. 27, 2022

(54) MANUFACTURING METHOD OF TOOTH PART, TOOTH PART, AND PROCESSING DEVICE OF TOOTH PART

(71) Applicant: AISIN CORPORATION, Kariya (JP)

(72) Inventors: Ryo Matsumoto, Anjo (JP); Takuya Maruyama, Anjo (JP)

(73) Assignee: AISIN CORPORATION, Kariya (JP)

( * ) Notice: Subject to any disclaimer, the term of this patent is extended or adjusted under 35 U.S.C. 154(b) by 212 days.

(21) Appl. No.: 16/769,441

(22) PCT Filed: Jan. 25, 2019

(86) PCT No.: PCT/JP2019/002555
§ 371 (c)(1),
(2) Date: Jun. 3, 2020

(87) PCT Pub. No.: WO2019/151149
PCT Pub. Date: Aug. 8, 2019

(65) Prior Publication Data
US 2020/0393003 A1  Dec. 17, 2020

(30) Foreign Application Priority Data
Jan. 31, 2018 (JP) .............................. JP2018-015722

(51) Int. Cl.
*F16D 13/60* (2006.01)
*B21D 22/02* (2006.01)
(Continued)

(52) U.S. Cl.
CPC ............. *F16D 13/60* (2013.01); *B21D 15/02* (2013.01); *B21D 22/02* (2013.01); *B21D 37/10* (2013.01);
(Continued)

(58) Field of Classification Search
CPC .... F16D 13/60; F16D 13/62; F16D 2250/002; B21D 15/02; B21D 22/02; B21D 37/10;
(Continued)

(56) References Cited

U.S. PATENT DOCUMENTS 6,095,006 A * 8/2000 Morita .................. F16D 13/683
192/70.2
6,523,663 B2 * 2/2003 Murata .................... F16D 13/62
74/434

(Continued)

FOREIGN PATENT DOCUMENTS

| CN | 103782049 A | 5/2014 |
|---|---|---|
| JP | 2006-057687 A | 3/2006 |
| JP | 2013-053643 A | 3/2013 |

OTHER PUBLICATIONS

International Search Report for PCT/JP2019/002555 dated Mar. 12, 2019 (PCT/ISA/210).

*Primary Examiner* — Lawrence Averick
(74) *Attorney, Agent, or Firm* — Sughrue Mion, PLLC

(57) ABSTRACT

The tooth part includes: a tubular portion having an inner tooth portion formed on an inner peripheral surface and an outer tooth portion formed on an outer peripheral surface; a plurality of inner peripheral wall portions that each extend in an axial direction of the tubular portion and form a tooth tip portion of the inner tooth portion and a tooth bottom portion of the outer tooth portion; a plurality of outer peripheral wall portions that each extend in the axial direction and form a tooth bottom portion of the inner tooth portion and a tooth tip portion of the outer tooth portion; and an annular rib that is joined to the outer peripheral wall portions and that extends in an annular shape on an open end side with respect to the inner peripheral wall portions in the axial direction and radially outward from the inner peripheral wall portions, at an open end of the tubular portion.

4 Claims, 14 Drawing Sheets

(51) Int. Cl.
*F16D 13/62* (2006.01)
*B21D 53/26* (2006.01)
*B21D 15/02* (2006.01)
*B21D 37/10* (2006.01)
*B21D 53/28* (2006.01)

(52) U.S. Cl.
CPC ............ *B21D 53/26* (2013.01); *B21D 53/28* (2013.01); *F16D 13/62* (2013.01)

(58) Field of Classification Search
CPC ........ B21D 53/26; B21D 53/28; B21D 37/12; B21H 5/02
See application file for complete search history.

(56) References Cited

U.S. PATENT DOCUMENTS

| | | | | |
|---|---|---|---|---|
| 6,868,950 | B2 * | 3/2005 | Masegi | F16D 13/683 74/434 |
| 8,240,446 | B2 * | 8/2012 | Szuba | F16D 13/683 192/112 |
| 10,107,384 | B2 * | 10/2018 | Shah | F16H 3/663 |
| 2001/0047917 | A1 * | 12/2001 | Murata | F16D 13/62 192/85.41 |
| 2003/0006118 | A1 * | 1/2003 | Masegi | F16D 13/60 192/70.2 |
| 2011/0297503 | A1 * | 12/2011 | Szuba | F16D 13/683 192/112 |
| 2012/0272503 | A1 * | 11/2012 | Szuba | F16D 13/683 29/428 |
| 2013/0059166 | A1 * | 3/2013 | Nagata | B21D 53/28 428/600 |
| 2013/0081439 | A1 * | 4/2013 | Nakashima | B21D 53/34 72/347 |
| 2013/0313064 | A1 * | 11/2013 | Szuba | F16D 13/52 192/70.2 |
| 2014/0339044 | A1 * | 11/2014 | Szuba | F16D 13/683 192/70.2 |
| 2017/0073790 | A1 * | 3/2017 | Sabo | C21D 1/34 |
| 2017/0074331 | A1 * | 3/2017 | Fisher | F16D 13/683 |
| 2018/0057903 | A1 * | 3/2018 | Sabo | B21J 5/12 |
| 2020/0393003 | A1 * | 12/2020 | Matsumoto | F16D 13/60 |

\* cited by examiner

MANUFACTURING METHOD OF TOOTH PART, TOOTH PART, AND PROCESSING DEVICE OF TOOTH PART

CROSS REFERENCE TO RELATED APPLICATIONS

This application is a National Stage of International Application No. PCT/JP2019/002555 filed Jan. 25, 2019, claiming priority based on Japanese Patent Application No. 2018-015722 filed Jan. 31, 2018 the entire contents of which are incorporated herein by reference.

TECHNICAL FIELD

The present disclosure is related to: a manufacturing method of a tooth part including a tubular portion, an inner tooth portion formed on an inner peripheral surface of the tubular portion, and an outer tooth portion formed on an outer peripheral surface of the tubular portion; a tooth part; and a processing device of a tooth part.

BACKGROUND ART

Conventionally, as a tooth part, a multi-plate clutch outer drum formed by press working a steel plate is known (for example, see Patent Document 1). The multi-plate clutch outer drum includes an end wall portion, a cylindrical portion (tubular portion) in which one end is connected to an outer peripheral end of the end wall portion and the other end is open, a large number of spline grooves and spline protrusions (inner tooth portions) that are arranged alternately in the circumferential direction on an inner peripheral surface of the cylindrical portion so as to extend in an axial direction, and an outer protrusion and an outer groove (outer tooth portion) formed on an outer peripheral surface of the cylindrical portion so as to correspond to each spline groove and spline protrusion. Conventionally, as a tooth part formed by press working, a cup shaped part including the following (for example, see Patent Document 2) is known: a disc-shaped bottom portion; a cylindrical portion (tubular portion) standing on an outer periphery of the bottom portion; and an inner peripheral recessed/protruded portion (inner tooth portion) including a plurality of protruded portions formed on an inner peripheral surface of the cylindrical portion and a plurality of recessed portions formed on an inner peripheral surface of the cylindrical portion so as to each be extended in an axial direction of the cylindrical portion. In the cup-shaped part, a plurality of outer peripheral recessed portions are formed on a bottom (base end) side of the outer peripheral surface of the cylindrical portion. Here, in the outer peripheral recessed portion, the outer peripheral surface is recessed radially inward at a position corresponding to the inner peripheral protruded portion. Further, on the open end side of the outer peripheral surface of the cylindrical portion, a smooth outer peripheral portion having generally the same diameter over the entire circumference of the outer peripheral surface is formed.

RELATED ART DOCUMENTS

Patent Documents

Patent Document 1: Japanese Unexamined Patent Application Publication No. 2006-57687 (JP 2006-57687 A)
Patent Document 2: Japanese Unexamined Patent Application Publication No. 2013-53643 (JP 2013-53643 A)

SUMMARY OF THE DISCLOSURE

Problem to be Solved by Various Aspects of the Disclosure

In the cup-shaped part described in Patent Document 2, since the smooth outer peripheral portion having no thickness reduction is formed on the open end portion side of the outer peripheral surface of the cylindrical portion, it is possible to further improve the strength of the cylindrical portion on the open end portion side, compared to the multi-plate clutch outer drum according to Patent Document 1. However, in the cup-shaped part described in Patent Document 2, the thickness of the open end portion of the cylindrical portion is increased due to the smooth outer peripheral portion being formed. Thus, when the open end portion is cut to adjust the axial length of the cylindrical portion, chipping of the cutting tool etc. may occur due to impact and friction of intermittent cutting. Further, when cutting the open end portion including the smooth outer peripheral portion by plastic working in order to adjust the axial length of the cylindrical portion, a large load needs to be applied to cut the open end portion.

Means for Solving the Problem

An aspect of the disclosure is to allow an axial length of a tubular portion to be easily adjusted while satisfactorily ensuring rigidity of a tooth part including a tubular portion, an inner tooth portion formed on an inner peripheral surface of the tubular portion, and an outer tooth portion formed on an outer peripheral surface of the tubular portion.

A manufacturing method of a tooth part of the present disclosure is a manufacturing method of a tooth part including a tubular portion, an inner tooth portion formed on an inner peripheral surface of the tubular portion, and an outer tooth portion formed on an outer peripheral surface of the tubular portion. In the manufacturing method, a plurality of inner peripheral wall portions that each extend in an axial direction of the tubular portion and form a tooth tip portion of the inner tooth portion and a tooth bottom portion of the outer tooth portion, a plurality of outer peripheral wall portions that each extend in the axial direction and form a tooth bottom portion of the inner tooth portion and a tooth tip portion of the outer tooth portion, and a plurality of tooth surface portions that each extend in the axial direction and connect the corresponding inner peripheral wall portion and the corresponding outer peripheral wall portion are formed in the tubular portion. Also in the manufacturing method, an annular rib that extends in an annular shape on a radially outer side than the inner peripheral wall portions is formed by pushing out the inner peripheral wall portions and the tooth surface portions radially outward while shearing, at an open end of the tubular portion.

Such a method forms the annular rib that extends in an annular shape on a radially outer side than the inner peripheral wall portions by pushing out the inner peripheral wall portions and the tooth surface portions radially outward while shearing, at the open end of the tubular portion. By forming the annular rib at the open end of the tubular portion in this way, the rigidity of the tooth part can be increased. Further, the thickness of the annular rib is substantially the same as the thickness of the inner peripheral wall portion and the tooth surface portion. Thus, since the annular rib can be easily cut, the axial length of the tubular portion of the tooth part can be easily adjusted. As a result, the axial length of the tubular portion can be easily adjusted while the rigidity of the tooth part is satisfactorily ensured.

DETAILED DESCRIPTION

Modes for carrying out the various aspects of the present disclosure will be described below with reference to the accompanying drawings.

Figure 1:
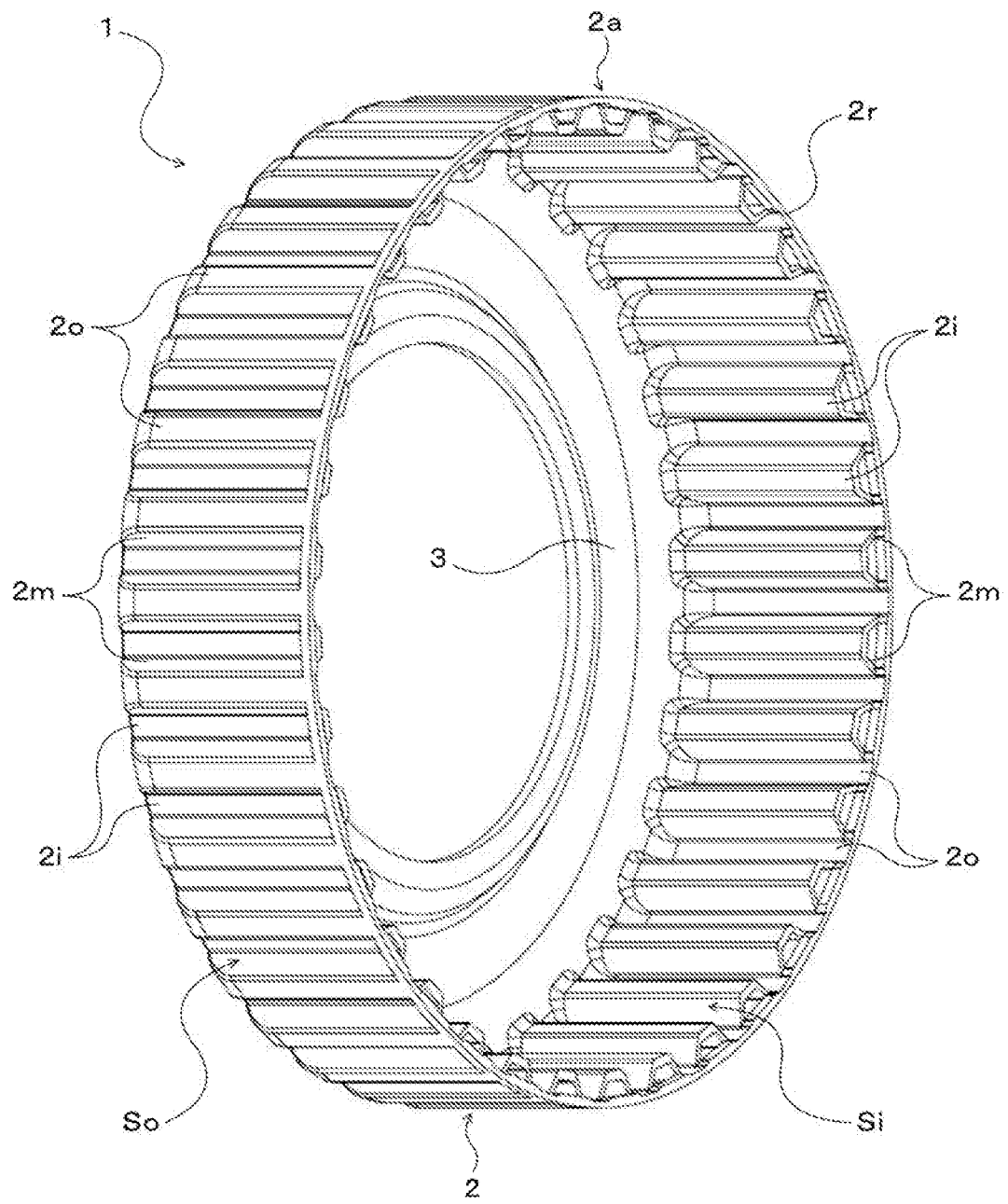
FIG. 1 is a perspective view illustrating an example of a tooth part of the present disclosure.
Figure 2:
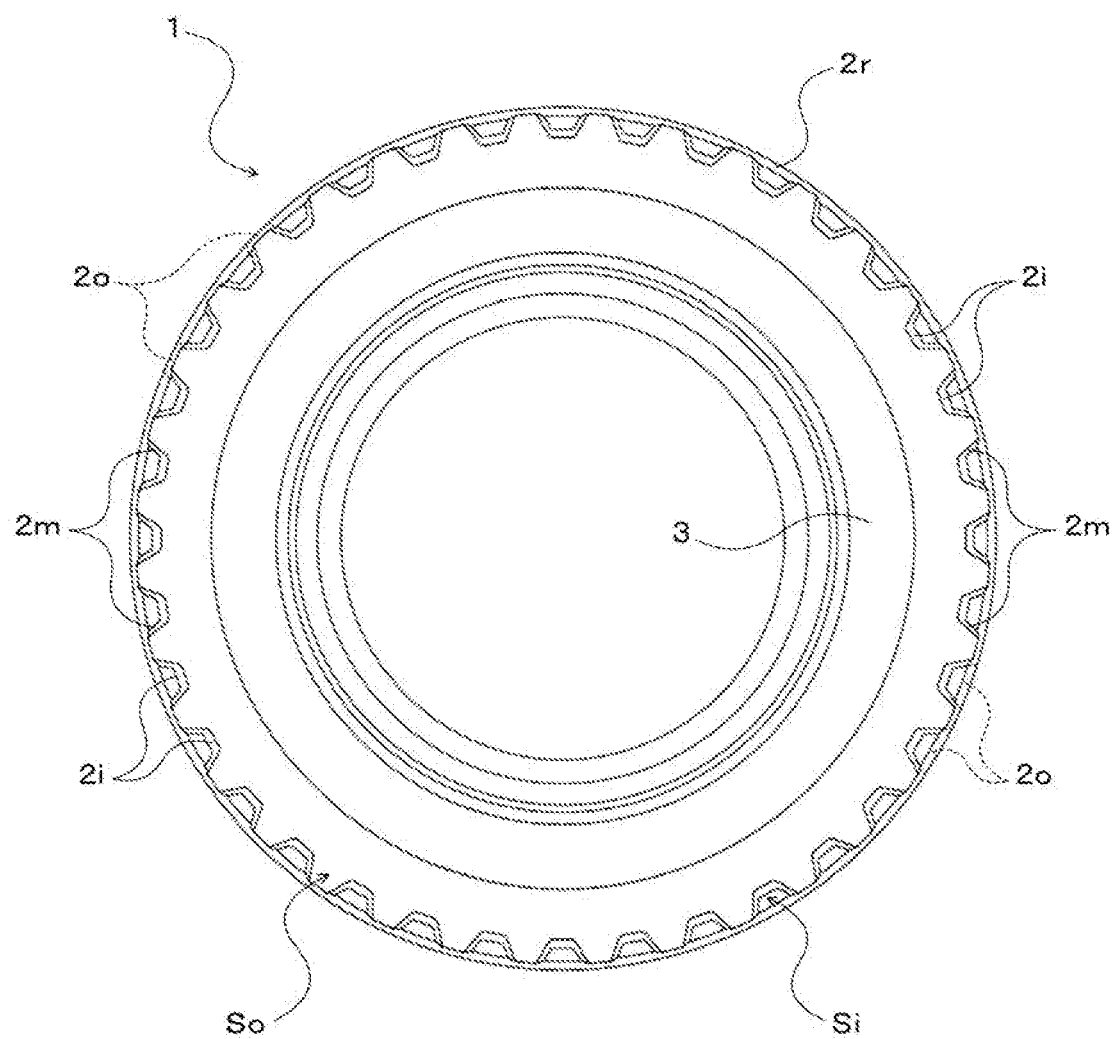
FIG. 2 is a front view illustrating the tooth part the present disclosure.

FIG. 1 is a perspective view illustrating a drum member 1 that is a tooth part of the present disclosure. FIG. 2 is a front view illustrating the drum member 1. The drum member 1 illustrated in FIG. 1 and FIG. 2 is used as a clutch drum of a clutch included in a vehicle transmission (not shown) and a hub of another clutch different from the clutch or a brake. As illustrated, the drum member 1 is formed in a bottomed cylindrical shape with one end opened, and includes a tubular portion 2 and an annular side wall portion (bottom portion) 3 that extends radially inward from an end portion (other end) on the opposite side of the tubular portion 2 from an open end 2a (see FIG. 1). The side wall 3 of the drum member 1 is connected to one of the clutches to be fastened.

On an inner peripheral surface of the tubular portion 2, an internal spline Si is formed. The internal spline Si serves as an internal tooth part including a plurality of internal teeth (protruded portions) that protrude radially inward and that are arranged at intervals in the circumferential direction. On an outer peripheral surface of the tubular portion 2, an external spline So is formed. The external spline So serves as an outer tooth portion including a plurality of external teeth (protruded portions) that protrude radially outward and that are arranged at intervals in the circumferential direction. An outer peripheral portion of a separator plate or a backing plate (friction engagement plate) of the clutch is fitted to the internal spline Si of the tubular portion 2 from the open end 2a side. An inner peripheral portion of a friction plate (friction engagement plate) of another clutch or brake is fitted to the external spline So of the tubular portion 2 from the other end side of the tubular portion 2.

Figure 3:
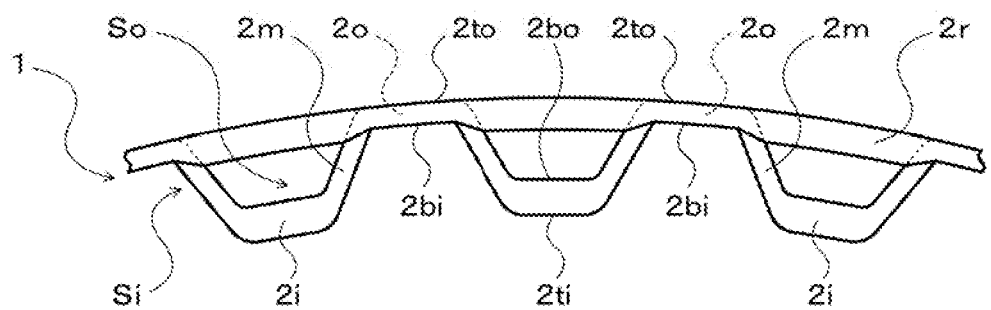
FIG. 3 is an enlarged view of a main portion of the tooth part of the present disclosure.

As illustrated in FIG. 1 and FIG. 3, the tubular portion 2 having the internal spline Si and the external spline So includes: a plurality of inner peripheral wall portions 2i arranged at intervals in the circumferential direction; a plurality of outer peripheral wall portions 2o positioned between the adjacent inner peripheral wall portions 2i and positioned radially outward from the inner peripheral wall portions 2i; and a plurality of tooth surface portions 2m that each connect the corresponding inner peripheral wall portion 2i and outer peripheral wall portion 2o. Each inner peripheral wall portion 2i extends in an axial direction of the tubular portion 2 and forms a tooth tip portion 2ti of the internal spline Si and a tooth bottom portion 2bo of the external spline So, as illustrated in FIG. 3. Each outer peripheral wall portion 2o extends in the axial direction of the tubular portion 2 and forms a tooth bottom portion 2bi of the internal spline Si and a tooth tip portion 2to of the external spline So, as illustrated in FIG. 3. Each tooth surface portion 2m extends in the axial direction of the tubular portion 2 to form a tooth surface of the internal spline Si and the external spline So.

Figure 4:
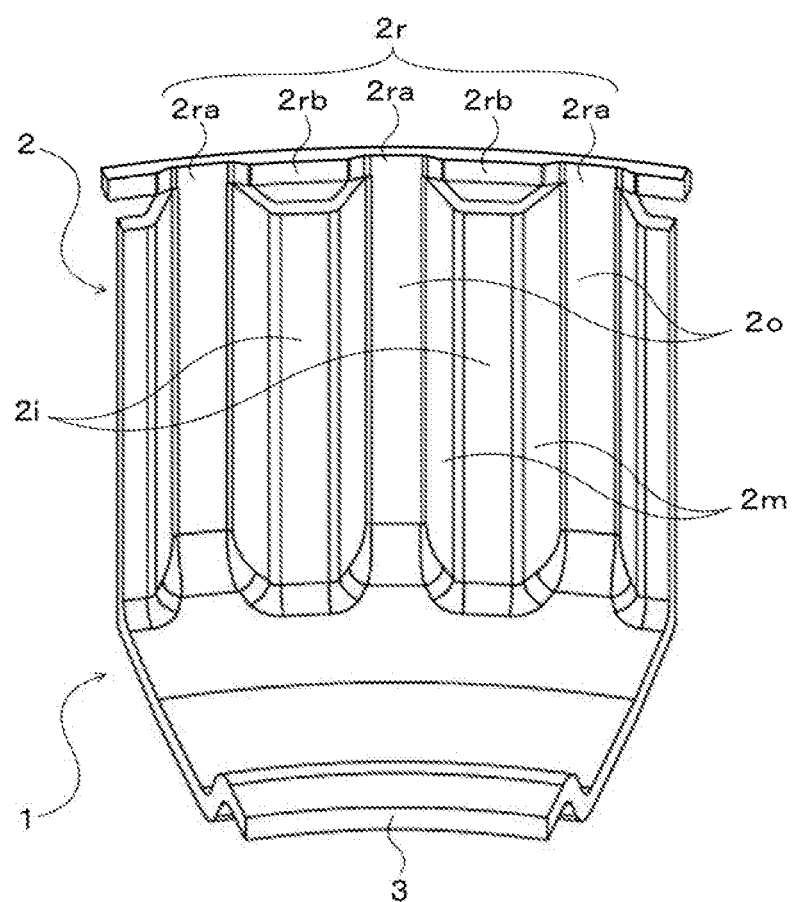
FIG. 4 is an enlarged perspective view illustrating the tooth part the present disclosure.

An annular rib 2r is formed on the open end 2a of the tubular portion 2. The annular rib 2r is joined to the outer peripheral wall portions 2o at the open end 2a of the tubular portion 2, and extends radially outward and on the open end 2a side of the inner peripheral wall portions 2i in the axial direction, in an annular shape. That is, as illustrated in FIG. 4, the annular rib 2r includes a plurality of joining portions 2ra each integrated with the outer peripheral wall portion 2o and a plurality of connecting portions 2rb that connect the adjacent joining portions 2ra to each other. In the present embodiment, the annular rib 2r extends annularly along the plurality of outer peripheral wall portions 2o, and an outer peripheral surface of the annular rib 2r is formed to be nearly flush with the tooth tip portion 2to (outer peripheral surface) of the outer peripheral wall portions 2o. An end face of the annular rib 2r is spaced away from the side wall 3 more than an end face of each inner peripheral wall 2i.

Figure 5:
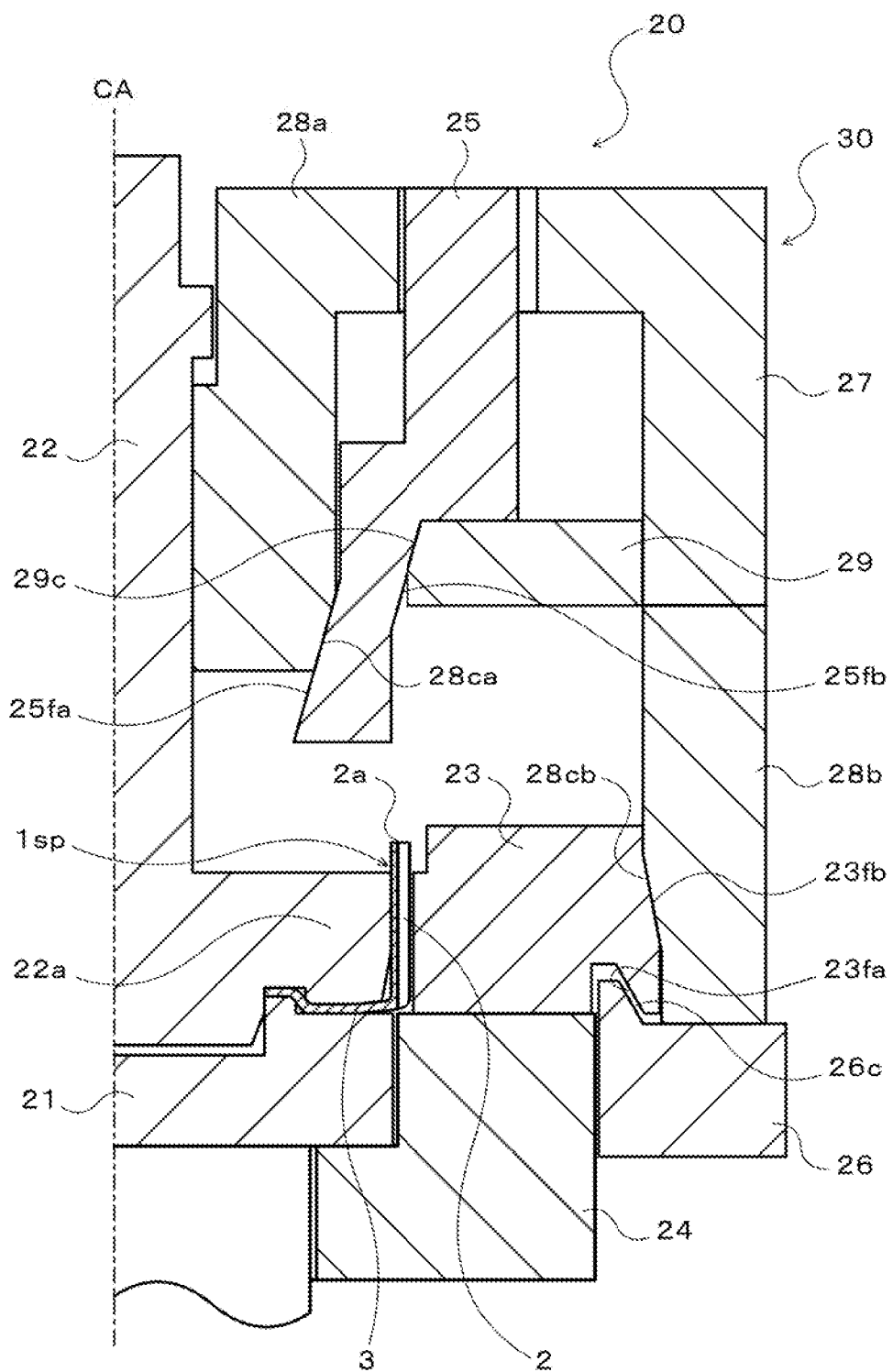
FIG. 5 is a sectional view illustrating a processing device of the tooth part of the present disclosure.
Figure 6:
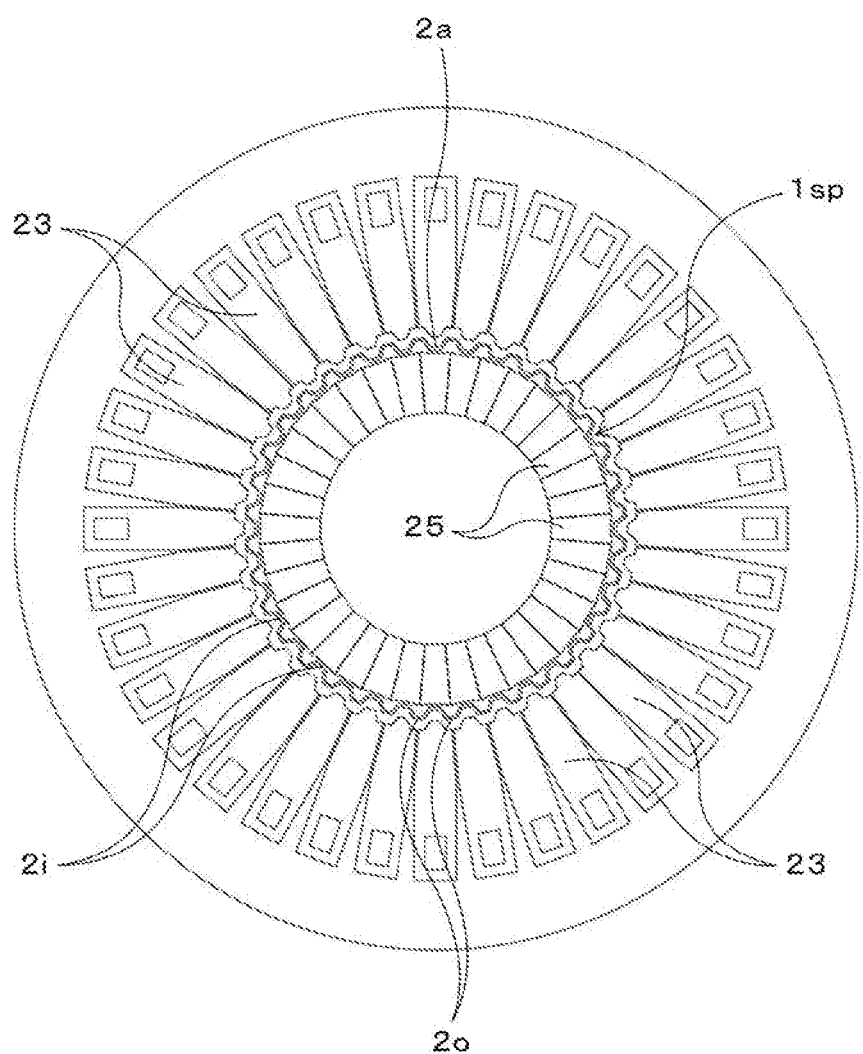
FIG. 6 is a plan view illustrating a main part of the processing device of the tooth part of the present disclosure.

FIG. 5 is a cross-sectional view illustrating a processing device 20 for forming the annular rib 2r on a semi-finished product 1sp (see FIG. 7) of the drum member 1 as described above, and FIG. 6 is a plan view illustrating a main portion of the processing device 20. As illustrated in FIG. 5 and FIG. 6, the processing device 20 includes: a disk-shaped lifter 21 that supports the outer surface of the side wall 3 of the semi-finished product 1sp; a pilot 22 having a workpiece supporting portion 22a that presses the inner surfaces of the tubular portion 2 and the side wall portion 3 of the semi-finished product 1sp; a plurality of dies 23; an annular die holder 24 fixed at an installation position of the processing device 20; a plurality of punches 25; an annular die returning member 26 disposed around the die holder 24; and a driving mechanism 30 that includes a die set 27, first and second cam drivers 28a and 28b that are each fixed to the die set 27, a punch returning portion 29 fixed to the die set 27, and a lifting device not shown that lifts and lowers the die set 27 etc. along a axis CA of the processing device 20.

The lifter 21 is lifted and lowered along the axis CA of the processing device 20 with respect to the die holder 24 by a lifting mechanism not shown. When the lifter 21 descends to a predetermined position, the descent of the lifter 21 is restricted by the die holder 24. The pilot 22 is lifted and lowered along the axis CA with respect to the lifter 21 and the die holder 24 by the lifting mechanism not shown. As illustrated in FIG. 6, a plurality of dies 23 is arranged radially around the axis CA on the die holder 24 so as to surround the pilot 22 and is each movable in the radial direction of the die holder 24.

As illustrated in FIG. 5 and FIG. 6, a plurality of punches 25 is supported by the die set 27 so as to be moveable in the radial direction of the die holder 24 and an extending direction of the axis CA, so as to be arranged radially about the axis CA above the workpiece supporting portion 22a of the pilot 22. Each punch 25 includes two driven surfaces 25fa, 25fb that are inclined so as to approach the axis CA of the processing device 20 as the driven surfaces 25fa, 25fb approach the workpiece supporting portion 22a. The die returning member 26 is disposed so as to be able to be lifted and lowered with respect to the die holder 24, and has a cam surface 26c that is abuttable against a driven surface 23fa formed on a lower part of each die 23. A first cam driver 28a includes a cam surface 28ca that abuts against the driven surface 25fa of each punch 25. A second cam driver 28b includes a cam surface 28cb that abuts against a driven surface 23fb formed on a side surface of each die 23. The punch returning portion 29 includes a cam surface 29c that abuts against the driven surface 25fb of the punch 25.

Next, a process of manufacturing the above drum member 1 will be described.

Figure 7:
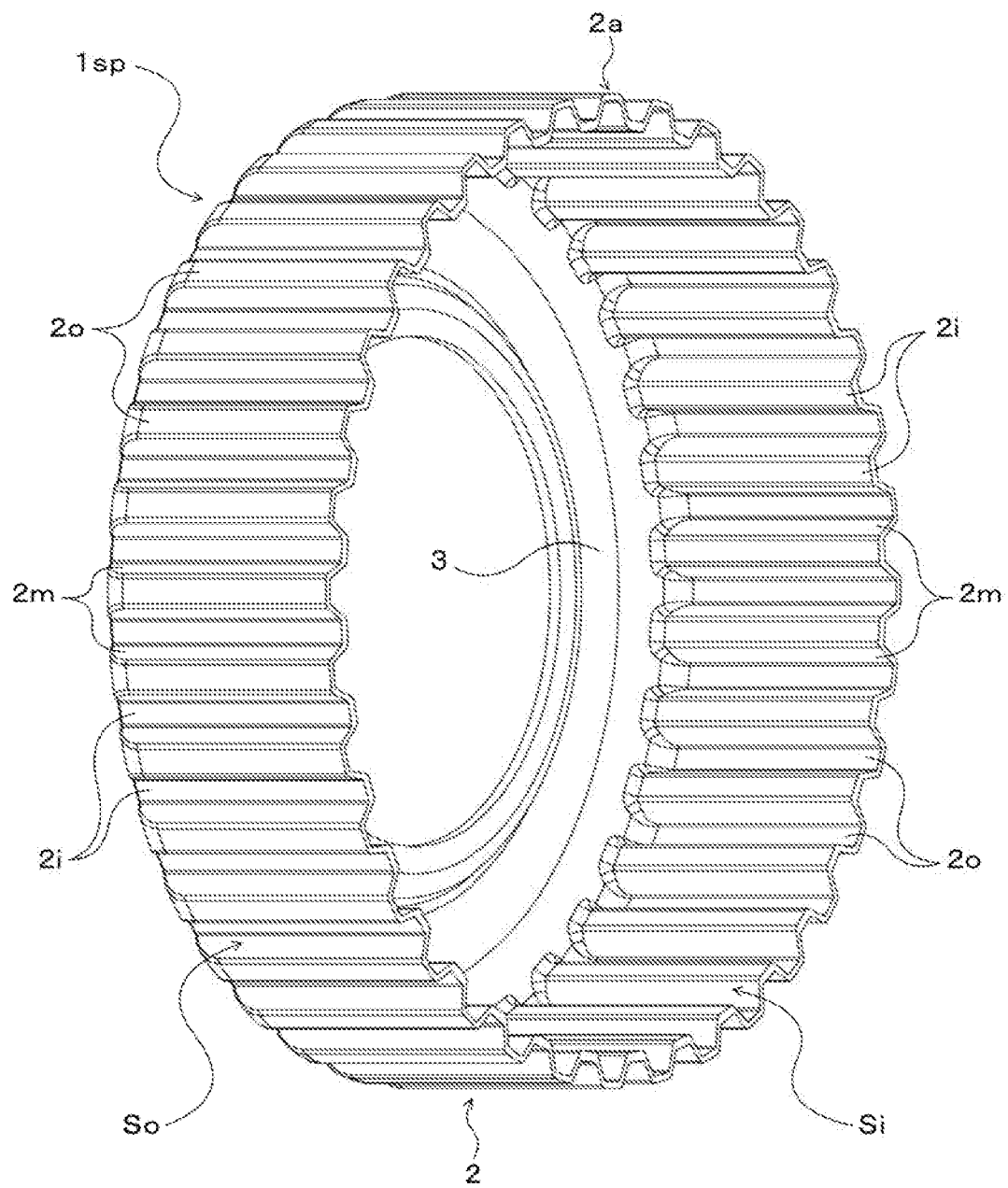
FIG. 7 is a perspective view illustrating a semi-finished product of the tooth part of the present disclosure.

When manufacturing the drum member 1, a metal plate such as a steel plate is first punched and drawn by using a press working machine not shown so as to obtain a bottomed tubular body that is made of metal and that has an annular side wall portion and a cylindrical portion extended from the side wall portion in the axial direction. The bottomed tubular body is then subjected to a well-known press working such as tooth ironing, Grob rolling, or roller tooth forming to form splines on the inner and outer peripheral surfaces of the cylindrical portion. In this way, as illustrated in FIG. 7, the semi-finished product 1sp of the drum member 1 including the tubular portion 2 and the side wall portion 3 is obtained. Here, the tubular portion 2 includes the internal spline Si formed on the inner peripheral surface and the external spline So formed on the outer peripheral surface. In the tubular portion 2 of the semi-finished product 1sp, formed are the following: the inner peripheral wall portions 2i arranged at intervals in the circumferential direction; the outer peripheral wall portions 2o that are positioned between the adjacent inner peripheral wall portions 2i and positioned radially outward from the inner peripheral wall portions 2i; and tooth surface portions 2m each connecting the corresponding inner peripheral wall portion 2i and the corresponding outer peripheral wall portion 2o.

Next, the semi-finished product 1sp of the drum member 1 is set in the above processing device 20, and the annular rib 2r is formed on the semi-finished product 1sp. When the semi-finished product 1sp is set in the processing device 20, the pilot 22 is moved with the punches 25 and the die set 27 to a standby position above the lifter 21 and the die holder 24. The lifter 21 is then moved above the die holder 24, and the semi-finished product 1sp is placed on the lifter 21 such that the outer surface of the side wall portion 3 abuts against a supporting surface of the lifter 21. The pilot 22 is lowered with the punches 25 and the die set 27, and the workpiece supporting portion 22a is abutted against the inner surface of the tubular portion 2 and the side wall 3 of the semi-finished product 1sp. The lifter 21, the pilot 22, the punches 25, and the die set 27 are lowered with respect to the die holder 24 until the descent of the lifter 21 is restricted by the die holder 24. In this way, as illustrated in FIG. 5, the semi-finished product 1sp is held by the lifter 21 and the pilot 22, and the open end 2a of the tubular portion 2 protrudes upward from a flat upper surface of the workpiece supporting portion 22a. When the lifter 21 and the pilot 22 are stopped at the lowered position illustrated in FIG. 5, a lower end surface of the second cam driver 28b abuts against an upper surface of the die returning member 26.

Figure 8:
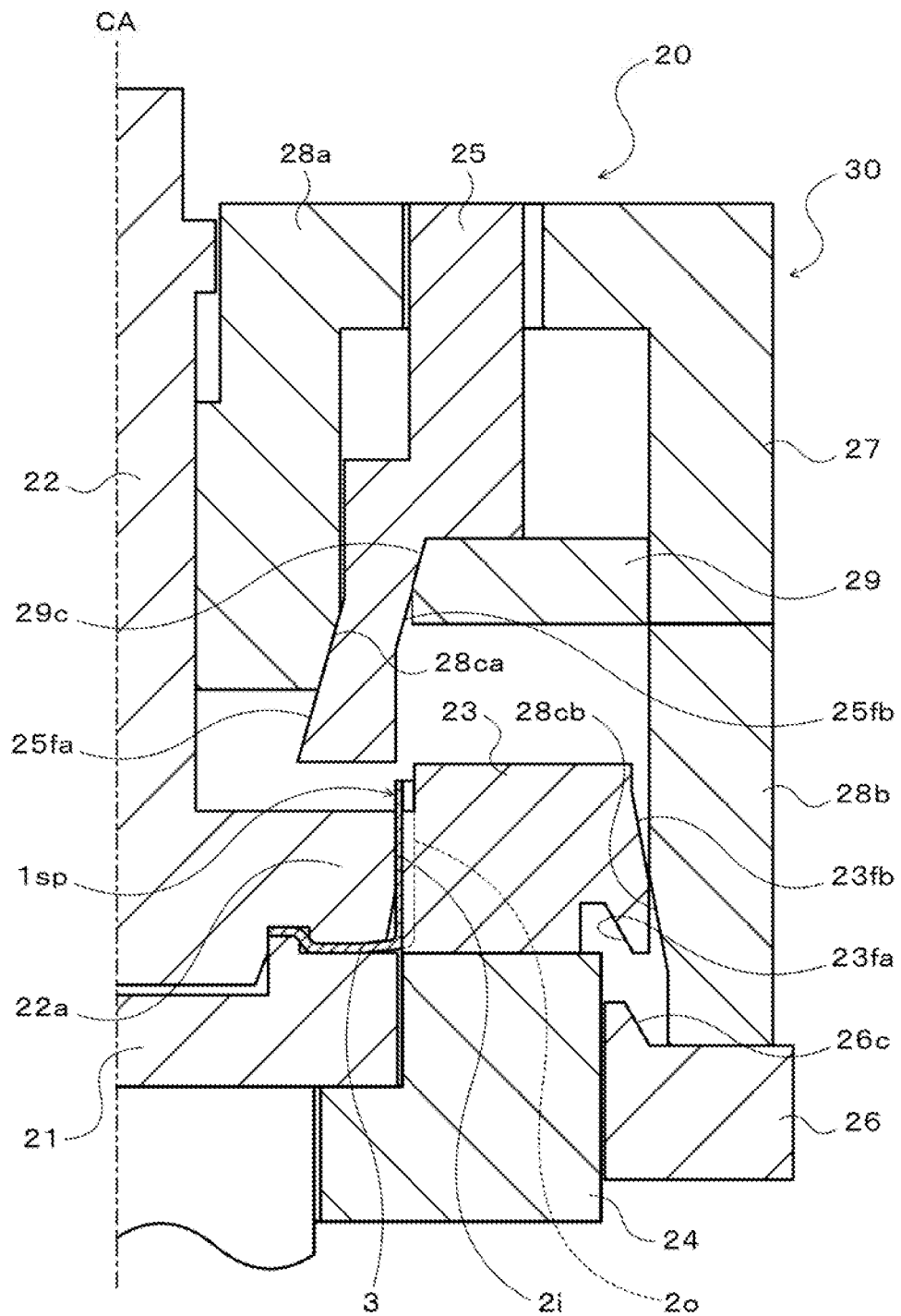
FIG. 8 is a cross-sectional view for explaining a manufacturing procedure of the tooth part of the present disclosure.
Figure 9:
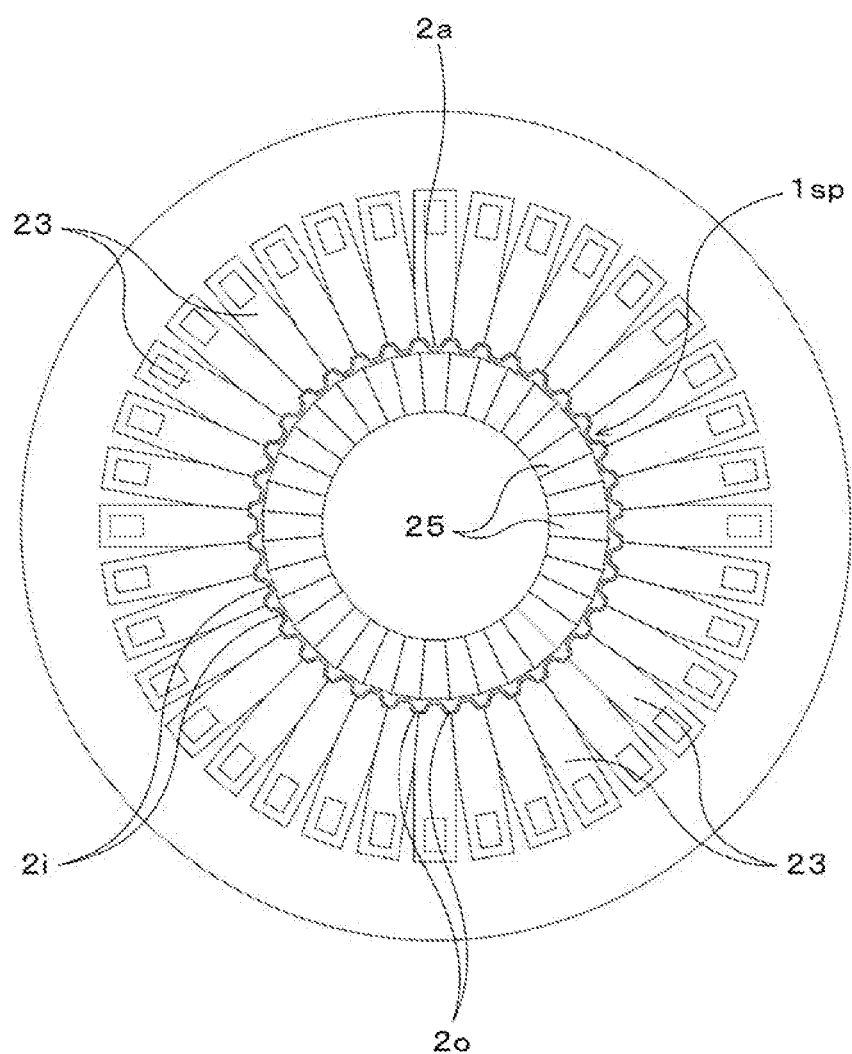
FIG. 9 is a plan view for explaining the manufacturing procedure of the tooth part of the present disclosure.

Subsequently, the die set 27 is lowered with respect to the lifter 21, the pilot 22, the die holder 24, and the like. In this way, the die returning member 26 is pushed down by the second cam driver 28b descending with the die set 27, and abutment of the cam surface 26c and the driven surface 23fa of each die 23 is released accordingly. As the second cam driver 28b descends, the driven surface 23fb of each die 23 is pressed by the cam surface 28cb of the second cam driver 28b, and each die 23 is moved toward the axis CA in the radial direction of the die holder 24. In this way, as illustrated in FIG. 8 and FIG. 9, each die 23 is abutted against one corresponding inner peripheral wall portion 2i of the tubular portion 2 of the semi-finished product 1sp and a part of the two outer peripheral wall portions 2o that are positioned on both sides of the inner peripheral wall portion 2i, so as to support the inner peripheral wall portion 2i and the outer peripheral wall portions 2o from the radially outer side.

When each die 23 abuts against the corresponding inner peripheral wall portion 2i and the corresponding outer peripheral wall portion 2o, the abutment between the driven surface 23fb of the die 23 and the cam surface 28cb of the second cam driver 28b is released as the die set 27 descends, and the radially inward movement of each die 23 is restricted by the second cam driver 28b. In contrast, the cam surface 28ca of the first cam driver 28a descending with the die set 27 presses the driven surface 25fa of the punch 25 downward and away from the axis CA. When the driven surface 25fa is pressed by the cam surface 28ca of the first cam driver 28a, each punch 25 descends as the die set 27 descends, so as to approach the upper surface of the workpiece supporting portion 22a of the pilot 22. Then, when the die set 27 descends further and each punch 25 comes into contact with the upper surface of the workpiece supporting portion 22a, each punch 25 faces the corresponding inner peripheral wall portion 2i and the tooth surface portion 2m that are radially inward from the open end 2a of the tubular portion 2, and moves in the radial direction of the die holder 24 in the direction away from the axis CA.

Figure 10:
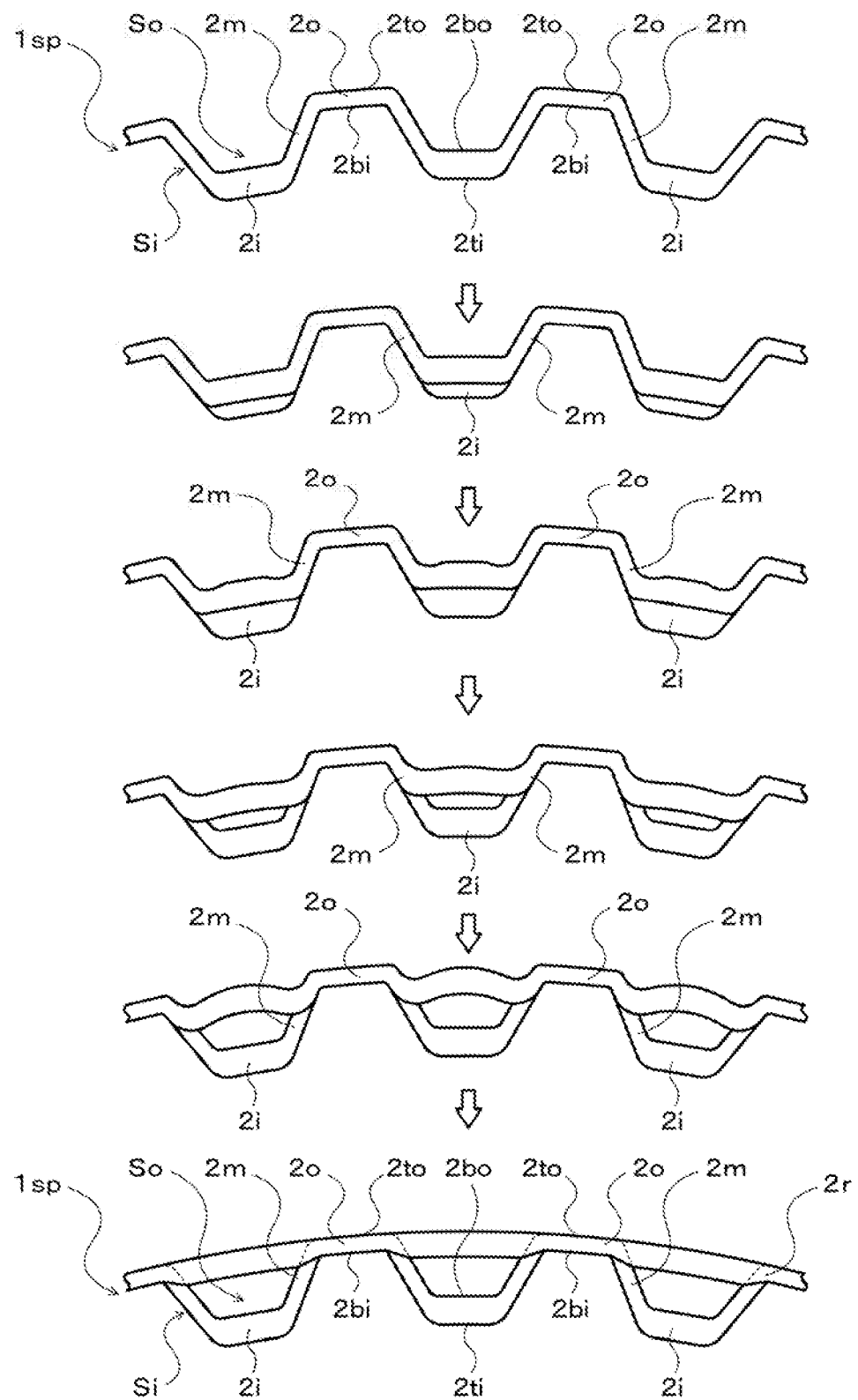
FIG. 10 is an explanatory diagram illustrating the manufacturing procedure of the tooth part of the present disclosure.
Figure 11:
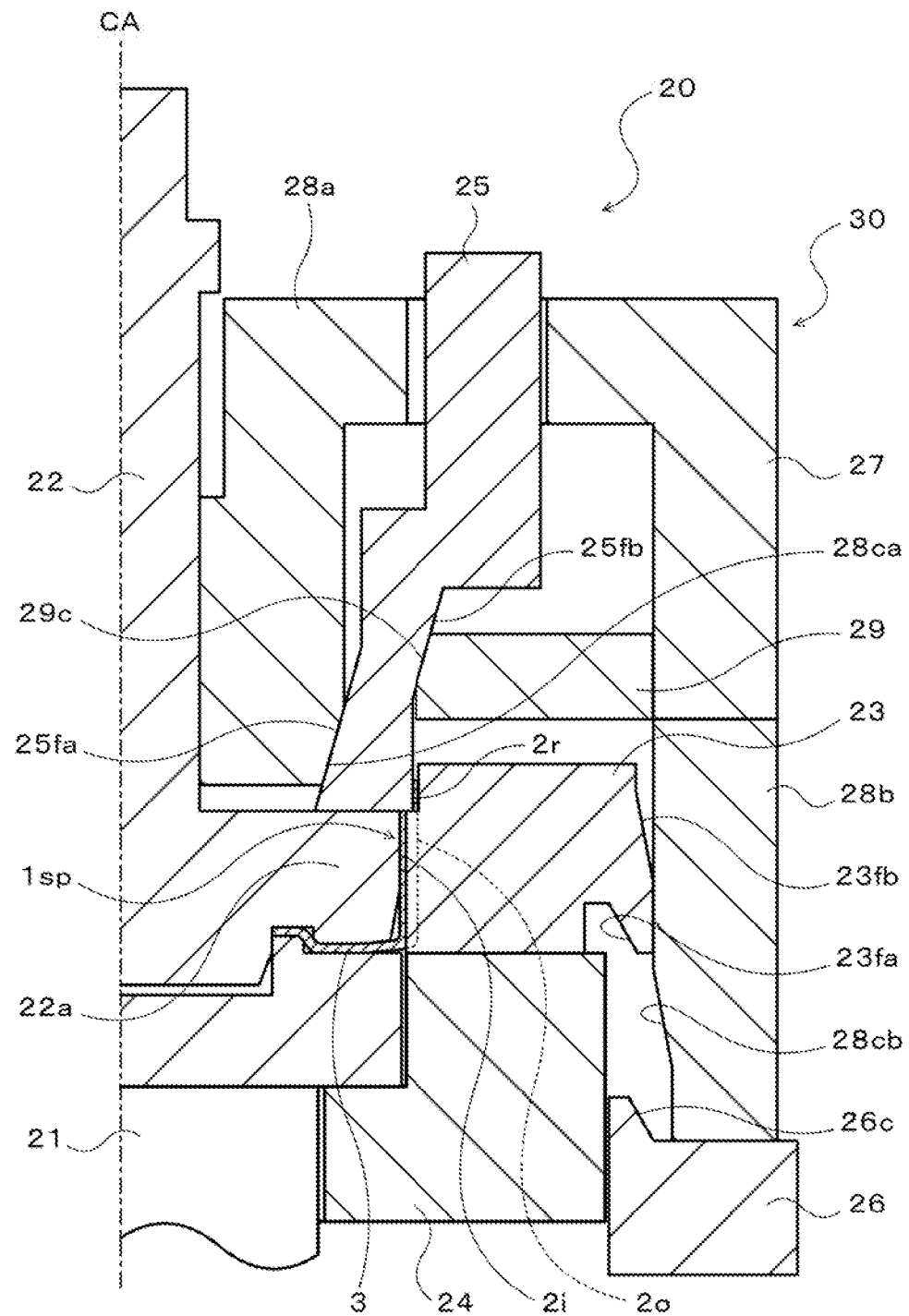
FIG. 11 is a cross-sectional view for explaining the manufacturing procedure of the tooth part of the present disclosure.
Figure 12:
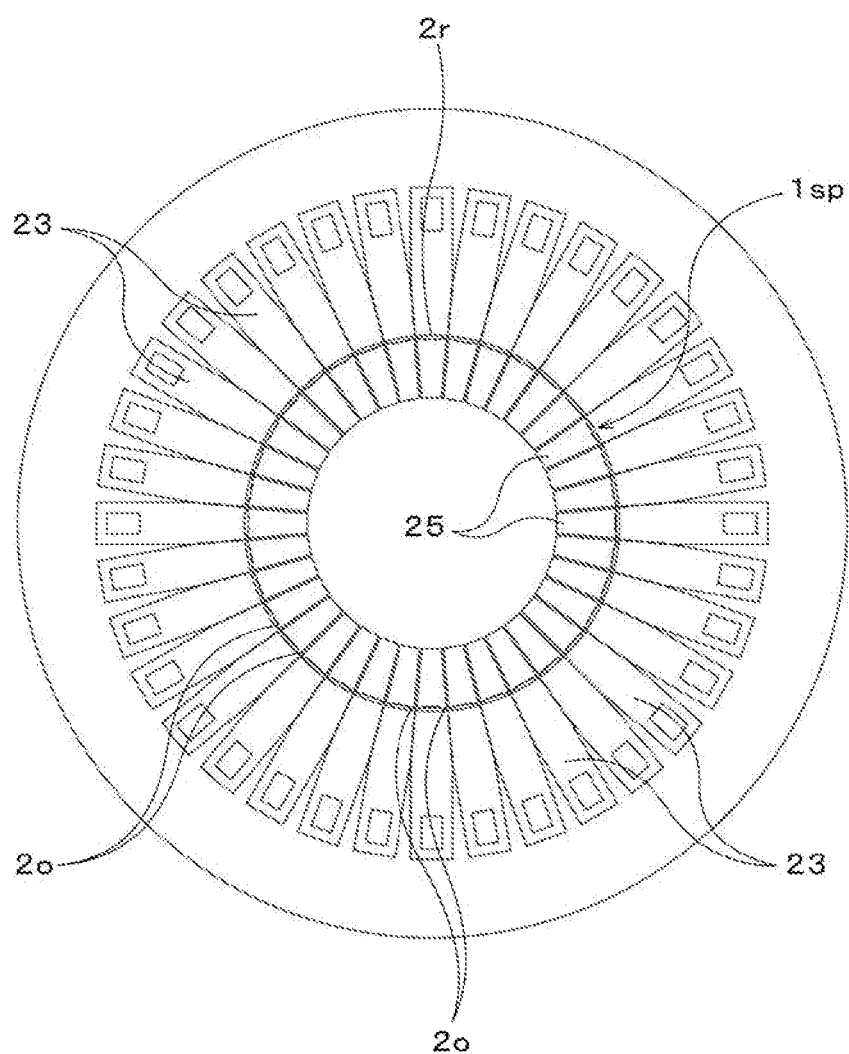
FIG. 12 is a plan view for explaining the manufacturing procedure of the tooth part of the present disclosure.

In this way, as illustrated in FIG. 10, each punch 25 pushes out the corresponding inner peripheral wall portion 2i and the corresponding tooth surface portions 2m radially outward while shearing, at the open end 2a of the tubular portion 2 of the semi-finished product 1sp. As a result, on the open end 2a of the tubular portion 2 of the semi-finished product 1sp, the annular rib 2r that extends annularly and radially outward from the inner peripheral wall portions 2i is formed. In the present embodiment, the descent of the die set 27 is stopped when the lower end surface of each punch 25 abuts against the upper surface of the workpiece supporting portion 22a of the pilot 22. As illustrated in FIG. 11, the annular rib 2r extends annularly along the outer peripheral wall portions 2o and the outer peripheral surface of the annular rib 2r becomes nearly flush with the tooth tip portion 2*to* (outer peripheral surface) of the outer peripheral wall portions 2*o*, when movement of each punch 25 is stopped.

When the annular rib 2*r* is formed on the tubular portion 2 of the semi-finished product 1*sp* as described above, the die set 27 is lifted, and the driven surface 25*fb* is pressed by the cam surface 29*c* of the punch returning portion 29. Thus, each punch 25 moves in the radial direction toward the axis CA so as to be spaced away from the tubular portion 2 and is lifted up by the punch returning portion 29 to be lifted with the die set 27 and the like. In addition, by lifting the second cam driver 28*b* with the die set 27, the die returning member 26 is lifted with respect to the die holder 24 by the lifting mechanism not shown and the cam surface 26*c* abuts against the driven surface 23*fa*. Thus, each die 23 moves in the radial direction so as to be spaced away from the axis CA, that is, the tubular portion 2. As the die set 27 is lifted, the pilot 22 is engaged with the first cam driver 28*a*, spaced away from the semi-finished product 1*sp*, and lifted with the die set 27 and the like to the standby position. The lifter 21 is then moved above the die holder 24 and the semi-finished product 1*sp* on which the annular rib 2*r* is formed is taken out of the lifter 21. The removed semi-finished product 1*sp* is subjected to trim processing and the like to adjust the axial length of the annular rib 2*r* and thus, the drum member 1 is completed. The axial length of the annular rib 2*r* can be adjusted by, for example, a trimming method described in Japanese Unexamined Patent Application Publication No. 2008-290143 (JP 2008-290143 A).

As described above, with the punches 25, the processing device 20 pushes out the inner peripheral wall portions 2*i* and the tooth surface portions 2*m* radially outward while shearing, at the open end 2*a* of the tubular portion 2 of the drum member 1, to form the annular rib 2*r* that extends in an annular shape on a radially outer side than the inner peripheral wall portions 2*i*. By using such a processing device 20, it is possible to manufacture the drum member 1 that has a high rigidity and that is light weight, at a low cost.

That is, when the annular rib 2*r* that is joined to the outer peripheral wall portions 2*o* and that extends in an annular shape on the open end 2*a* side with respect to the inner peripheral wall portions 2*i* in the axial direction and radially outward from the inner peripheral wall portions 2*i* is formed on the open end 2*a* of the tubular portion 2, it is possible to satisfactorily ensure the rigidity of the tubular portion 2 having the internal spline Si formed on the inner peripheral surface and the external spline So formed on the outer peripheral surface and also make the tubular portion 2 thinner. In this way, it is possible to satisfactorily ensure the rigidity of the drum member 1 and also make the material (steel plate) thinner to reduce the weight of the entire drum member 1. In particular, in the drum member 1, the ratio of the mass of the tubular portion 2 relative to the total weight is around 50 to 60%, which is large. Thus, forming the annular rib 2*r* on the open end 2*a* of the tubular portion 2 to allow the tubular portion 2 to become thinner is useful when reducing the weight of the entire drum member 1. Also in the drum member 1, it is possible to sufficiently suppress an increase in costs, since it is possible to reduce an excess material portion and shorten the cutting step, compared to when the thickness of the material is increased and then the open end of the tubular portion is formed in a cylindrical shape or the outer peripheral surface of the open end is formed in a cylindrical surface shape. As a result, it is possible to reduce the weight and lower costs while satisfactorily ensuring the rigidity of the drum member 1 including the tubular portion 2 that has the internal spline Si formed on the inner peripheral surface and the external spline So formed on the outer peripheral surface. The thickness of the annular rib 2*r* is substantially the same as the thickness of the inner peripheral wall 2*i* and the tooth surface portion 2*m*. Thus, since the annular rib 2*r* can be easily cut, the axial length of the tubular portion 2 of the drum member 1 can be easily adjusted. As a result, the axial length of the tubular portion 2 can be easily adjusted while the rigidity of the drum member 1 is satisfactorily ensured.

In the drum member 1, a friction engagement plate (such as a friction plate or a separator plate) is to be fitted to both the internal spline Si formed on the inner peripheral surface and the external spline So formed on the outer peripheral surface. However, the drum member 1 serving as the tooth part may be configured such that the frictional engagement plate is fitted on either the inner peripheral side or the outer peripheral side. That is, the tooth part of the present disclosure may be configured as a clutch drum in which a friction engagement plate (such as a separator plate) is fitted only to the internal spline Si on the inner peripheral surface. The tooth part of the present disclosure may be configured as a hub for a clutch or a brake in which a friction engagement plate (friction plate) is fitted only to the external spline So on the outer peripheral surface. The tooth part of at least one of the inner peripheral surface and the outer peripheral surface of the drum member 1 does not necessarily have to be a spline, but only need be recessed and protruded portions that are arranged alternately in the circumferential direction.

Figure 13:
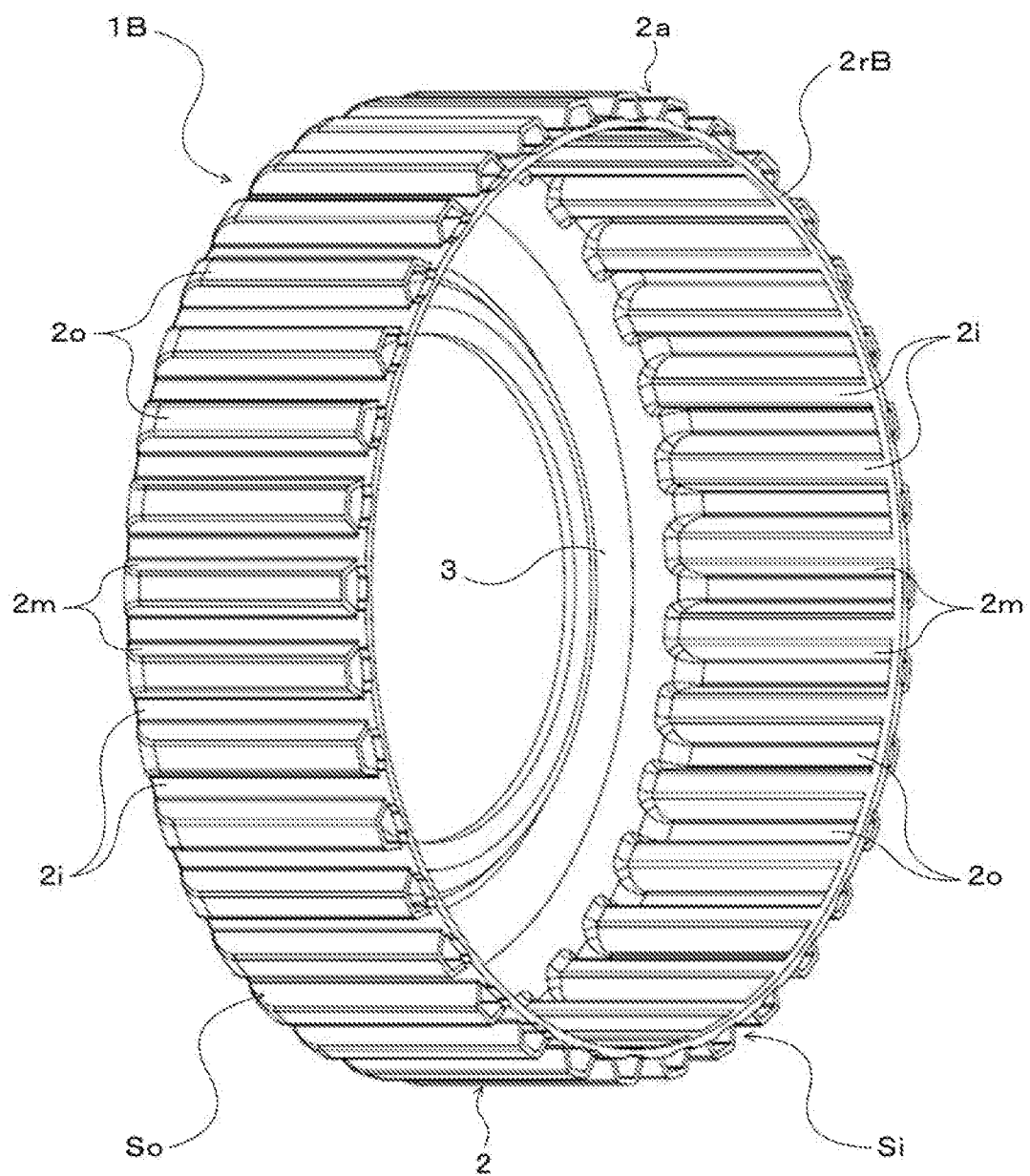
FIG. 13 is a perspective view illustrating another tooth part of the present disclosure.
Figure 14:
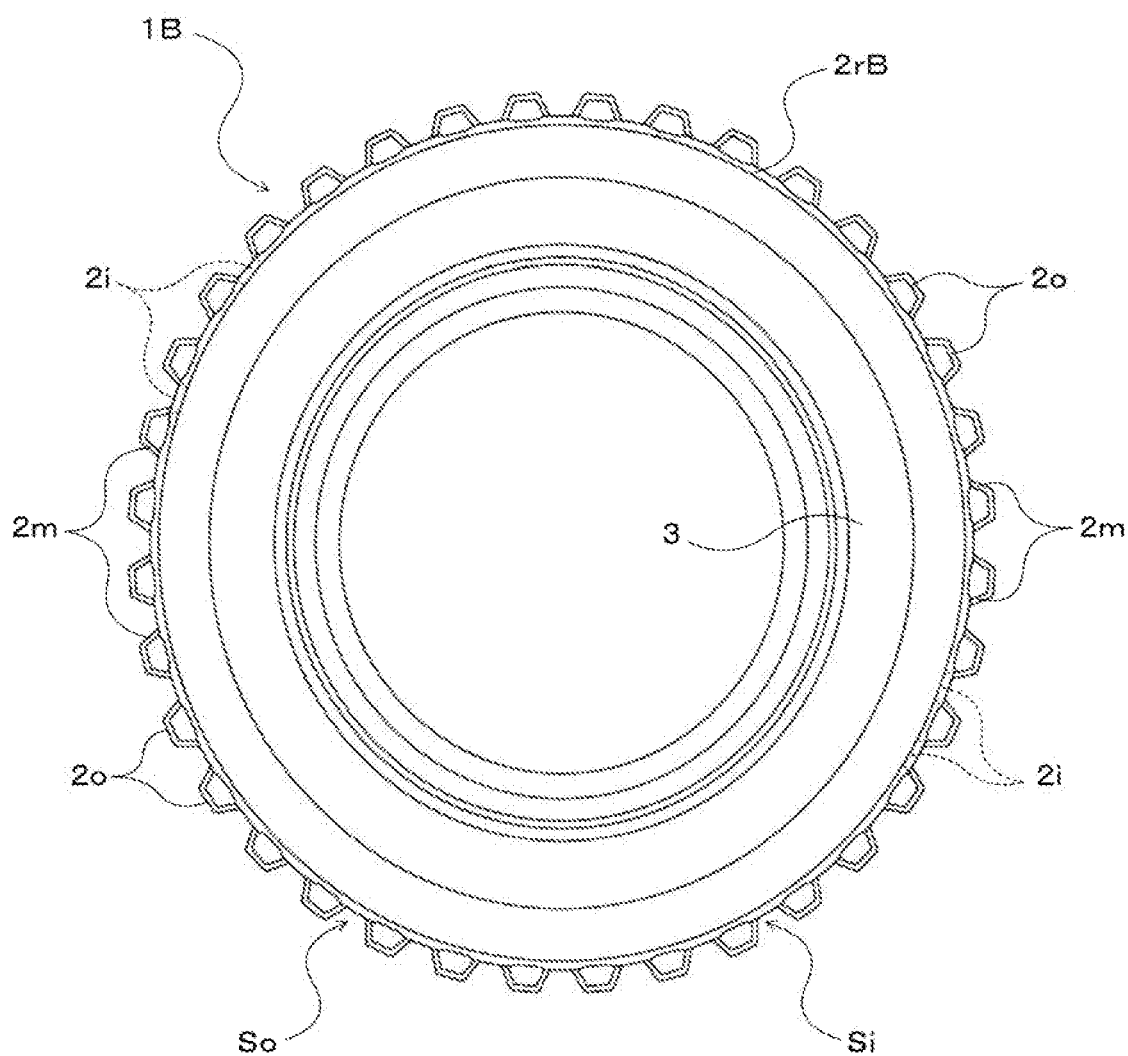
FIG. 14 is a front view illustrating the other tooth part of the present disclosure.
Figure 15:
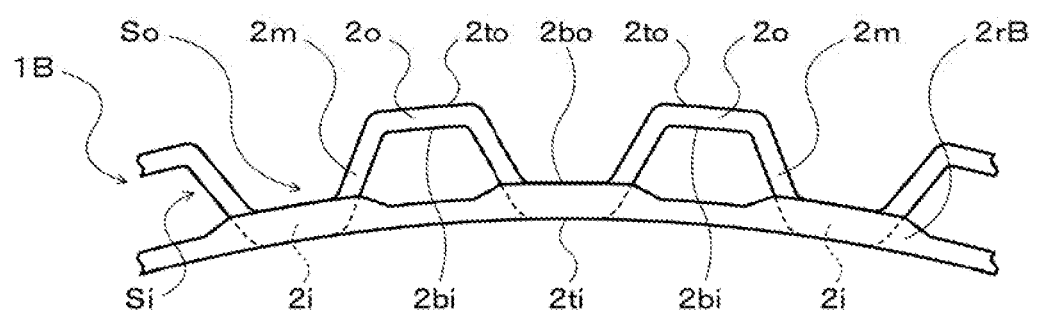
FIG. 15 is an enlarged view of a main part of the other tooth part of the present disclosure.

FIG. 13 is a perspective view illustrating a drum member 1B that is another tooth part of the present disclosure. FIG. 14 is a front view illustrating the drum member 1B. FIG. 15 is an enlarged view of a main part of the drum member 1B. Among the components of the drum member 1B, the same elements as those of the above drum member 1 are denoted by the same symbols and redundant description will be omitted.

The drum member 1B illustrated in FIG. 13 to FIG. 15 is used as a hub for a clutch or a brake included in a vehicle transmission that are not shown. As illustrated in FIG. 13 to FIG. 15, the drum member 1B is formed in a bottomed cylindrical shape with one end opened, and includes the tubular portion 2 having the internal spline Si on the inner peripheral side and the external spline So on the outer peripheral side, and the annular side wall portion 3 that extends radially inward from the end portion (other end) on the opposite side of the tubular portion 2 from the open end 2*a* (see FIG. 13). The tubular portion 2 of the drum member 1B also includes: the inner peripheral wall portions 2*i* that are arranged at intervals in the circumferential direction and that form the tooth tip portion 2*ti* of the internal spline Si and the tooth bottom portion 2*bo* of the external spline So; the outer peripheral wall portions 2*o* that are positioned between the adjacent inner peripheral wall portions 2*i*, that are positioned radially outward of the inner peripheral wall portions 2*i*, and that form the tooth bottom portion 2*bi* of the internal spline Si and the tooth tip portion 2*to* of the external spline So; and the tooth surface portions 2*m* that each connect the corresponding inner peripheral wall portion 2*i* and the corresponding outer peripheral wall portion 2*o* and also form the tooth surfaces of the internal spline Si and the external spline So. The side wall portion 3 of the drum member 1B is coupled to one of the fastening targets of the above clutch or a fastening (fixation) target of a brake. In the external spline So of the tubular portion 2, an inner peripheral portion of the friction plate (friction engagement plate) of the clutch or the brake is fitted from the other end side of the tubular portion 2.

As illustrated in FIG. 13 to FIG. 15, an annular rib 2rB is formed on the open end 2a of the tubular portion 2 of the drum member 1B. The annular rib 2rB is joined to the inner peripheral wall portions 2i at the open end 2a of the tubular portion 2, and extends in an annular shape on the open end 2a side with respect to the outer peripheral wall portions 2o in the axial direction and radially inward from the outer peripheral wall portions 2o. The annular rib 2rB of the drum member 1B also includes a plurality of joining portions each integrated with the inner peripheral wall portion 2i, and a plurality of connecting portions connecting the adjacent joining portions to each other. In the drum member 1B, the annular rib 2rB extends in an annular shape along the inner peripheral wall portions 2i, and the inner peripheral surface of the annular rib 2rB is formed nearly flush with the tooth tip portion (inner peripheral surface) of the inner peripheral wall portions 2i. The end face of the annular rib 2r is spaced away from the side wall portion 3 more than the end face of each outer peripheral wall portion 2o.

In this way, formed on the open end 2a of the tubular portion 2 is the annular rib 2rB that is joined to the inner peripheral wall portions 2i, and extends in an annular shape on the open end 2a side with respect to the outer peripheral wall portions 2o in the axial direction and radially inward from the outer peripheral wall portions 2o. Even in such a case, it is possible to sufficiently ensure the rigidity of the tubular portion 2 that has the internal spline Si formed on the inner peripheral surface and the external spline So formed on the outer peripheral surface and also make the tubular portion 2 thinner. In this way, it is possible to sufficiently ensure the rigidity of the drum member 1B and also make the material (steel plate) thinner to reduce the weight of the entire drum member 1B. In the drum member 1B, the ratio of the mass of the tubular portion 2 relative to the total weight is around 50 to 60%, which is large. Thus, forming the annular rib 2rB on the open end 2a of the tubular portion 2 to allow the tubular portion 2 to become thinner is useful when reducing the weight of the entire drum member 1B. Also in the drum member 1B, it is possible to sufficiently suppress an increase in costs, since it is possible to reduce an excess material portion and shorten the cutting step, compared to when the thickness of the material is increased and then the open end of the tubular portion is formed in a cylindrical shape or the outer peripheral surface of the open end is formed in a cylindrical surface shape. As a result, it is possible to reduce weight and lower costs while satisfactorily ensuring the rigidity of the drum member 1B including the tubular portion 2 that has the internal spline Si formed on the inner peripheral surface and the external spline So formed on the outer peripheral surface.

When manufacturing the above drum member 1B, the annular rib 2rB that extends radially inward from the outer peripheral wall portions 2o in an annular shape may be formed by pushing in the outer peripheral wall portions 2o and the tooth surface portions 2m radially inward while shearing, at the open end 2a of the tubular portion 2, after forming the semi-finished product 1sp. Here, the semi-finished product 1sp includes the side wall portion 3 and the tubular portion 2 that has the internal spline Si formed on the inner peripheral surface and the external spline So formed on the outer peripheral surface. In such a case, a processing device including the following may be used: a plurality of dies that each support the corresponding inner peripheral wall portion 2i and the corresponding outer peripheral wall portion 2o from the radially inner side; a plurality of punches that are each disposed radially outward of the open end 2a of the tubular portion 2 so as to face the corresponding outer peripheral wall portion 2o and the corresponding tooth surface portion 2m; and a driving mechanism that moves the punches radially inward so as to push in the corresponding outer peripheral wall portion 2o and the corresponding tooth surface portion 2m radially inward while shearing, while making the dies support the inner peripheral wall portion 2i and the outer peripheral wall portion 2o from the radially inner side. In this way, it is possible to manufacture a lightweight drum member 1B having a high rigidity, at a low cost. The thickness of the annular rib 2rB is generally the same as the thickness of the outer peripheral wall portion 2o and the tooth surface portion 2m. Thus, since the annular rib 2rB can also be easily cut, the axial length of the tubular portion 2 of the drum member 1B can be easily adjusted. As a result, the axial length of the tubular portion 2 can be easily adjusted while satisfactorily ensuring the rigidity of the drum member 1B. The tooth part on the inner peripheral surface of the drum member 1B does not necessarily need to be a spline, and may be recessed and protruded portions that are alternately arranged in the circumferential direction.

As described above, a manufacturing method of a tooth part of the present disclosure is a manufacturing method of a tooth part (1) including a tubular portion (2), an inner tooth portion (Si) formed on an inner peripheral surface of the tubular portion (2), and an outer tooth portion (So) formed on an outer peripheral surface of the tubular portion (2). In the manufacturing method, a plurality of inner peripheral wall portions (2i) that each extend in an axial direction of the tubular portion (2) and form a tooth tip portion (2ti) of the inner tooth portion (Si) and a tooth bottom portion (2bo) of the outer tooth portion (So), a plurality of outer peripheral wall portions (2o) that each extend in the axial direction and form a tooth bottom portion (2bi) of the inner tooth portion (Si) and a tooth tip portion (2to) of the outer tooth portion (So), and a plurality of tooth surface portions (2m) that each extend in the axial direction and connect the inner peripheral wall portion (2i) and the outer peripheral wall portion (2o) are formed in the tubular portion (2), and an annular rib (2r) that extends radially outward from the inner peripheral wall portions (2i) in an annular shape is formed by pushing out the inner peripheral wall portions (2i) and the tooth surface portions (2m) radially outward while shearing, at an open end (2a) of the tubular portion (2).

Such a method forms the annular rib that extends in an annular shape on a radially outer side than the inner peripheral wall portions by pushing out the inner peripheral wall portions and the tooth surface portions radially outward while shearing, at the open end of the tubular portion. By forming the annular rib at the open end of the tubular portion in this way, the rigidity of the tooth part can be increased. The thickness of the annular rib is substantially the same as the thickness of the inner peripheral wall portion and the tooth surface portion. Thus, since the annular rib can be easily cut, the axial length of the tubular portion of the tooth part can be easily adjusted. As a result, the axial length of the tubular portion can be easily adjusted while the rigidity of the tooth part is satisfactorily ensured.

When forming the annular rib (2r), the annular rib (2r) may be formed so as to extend along the outer peripheral wall portions (2o) in an annular shape by pushing out the inner peripheral wall portions (2i) and the tooth surface portions (2m) radially outward while shearing, at the open end (2a) of the tubular portion (2). In this way, the rigidity of the tooth part can be further improved.

The manufacturing method of another tooth part of the present disclosure is a manufacturing method of a tooth part (1B) including a tubular portion (2), an inner tooth portion (Si) formed on an inner peripheral surface of the tubular portion (2), and an outer tooth portion (So) formed on an outer peripheral surface of the tubular portion (2). In the manufacturing method, a plurality of inner peripheral wall portions (2i) that each extend in an axial direction of the tubular portion (2) and form a tooth tip portion (2ti) of the inner tooth portion (Si) and a tooth bottom portion (2bo) of the outer tooth portion (So), a plurality of outer peripheral wall portions (2o) that each extend in the axial direction and form a tooth bottom portion (2bi) of the inner tooth portion (Si) and a tooth tip portion (2to) of the outer tooth portion (So), and a plurality of tooth surface portions (2m) that each extend in the axial direction and connect the inner peripheral wall portion (2i) and the outer peripheral wall portion (2o) are formed in the tubular portion (2), an annular rib (2rB) that extends radially inward from the outer peripheral wall portions (2o) in an annular shape is formed by pushing in the outer peripheral wall portions (2o) and the tooth surface portions (2m) radially inward while shearing, at an open end (2a) of the tubular portion (2).

Such a method forms the annular rib that extends radially inward from the outer peripheral wall portions in an annular shape by pushing out the outer peripheral wall portions and the tooth surface portions radially inward while shearing, at the open end of the tubular portion. By forming the annular rib at the open end of the tubular portion in this way, the rigidity of the tooth part can be increased. The thickness of the annular rib is substantially the same as the thickness of the outer peripheral wall portion and the tooth surface portion. Thus, since the annular rib can be easily cut, the axial length of the tubular portion of the tooth part can be easily adjusted. As a result, the axial length of the tubular portion can be easily adjusted while the rigidity of the tooth part is satisfactorily ensured.

When forming the annular rib (2rB), the annular rib (2rB) may be formed so as to extend along the inner peripheral wall portions (2i) in an annular shape by pushing in the inner peripheral wall portions (2i) and the tooth surface portions (2m) radially inward while shearing, at the open end (2a) of the tubular portion (2). In this way, the rigidity of the tooth part can be further improved.

The tooth part of the present disclosure includes a tubular portion (2), an inner tooth portion (Si) formed on an inner peripheral surface of the tubular portion (2), and an outer tooth portion formed on an outer peripheral surface of the tubular portion (2). The tooth part (1) includes: a plurality of inner peripheral wall portions (2i) that each extend in an axial direction of the tubular portion (2) and form a tooth tip portion (2ti) of the inner tooth portion (Si) and a tooth bottom portion (2bo) of the outer tooth portion (So); a plurality of outer peripheral wall portions (2o) that each extend in the axial direction and form a tooth bottom portion (2bi) of the inner tooth portion (Si) and a tooth tip portion (2to) of the outer tooth portion (So); and an annular rib (2r) that is joined to the outer peripheral wall portions (2o) and that extends in an annular shape on a radially outer side than the inner peripheral wall portions (2i), at an open end (2a) of the tubular portion (2).

In such a tooth part, the annular rib that is joined to the outer peripheral walls and that extends radially inward from the inner peripheral wall portion in an annular shape is formed at the open end of the tubular portion. In this way, the rigidity of the tooth part can be increased. Further, in such a tooth part, since the thickness of the annular rib can be suppressed from being increased, the annular rib can be easily cut and the axial length of the tubular portion of the tooth part can be easily adjusted. As a result, the axial length of the tubular portion can be easily adjusted while the rigidity of the tooth part is satisfactorily ensured.

The annular rib (2r) may be extended along the outer peripheral wall portions (2o) in an annular shape. In this way, the rigidity of the tooth part can be further improved.

Further, the tooth part (1) may include an annular side wall (3) that extends radially inward from an end portion on the opposite side of the tubular portion (2) from the open end (2a). The inner tooth portion (Si) may be an internal spline to which an outer peripheral portion of a friction engagement plate of a clutch is fitted from a side of the open end (2a). That is, the tooth part of the present disclosure may be configured as a clutch drum of a clutch.

The tooth part (1) may include the annular side wall (3) that extends radially inward from the other end on the opposite side of the tubular portion (2) from the open end (2a), and the outer tooth portion (So) may be an external spline to which an inner peripheral portion of an friction plate of an clutch or a brake is fitted from a side of the other end. That is, the tooth part of the present disclosure may be configured as a hub of a clutch or a brake, or a drum member to which a friction engagement plate is fitted on both the inner and outer peripheral sides.

Another tooth part of the present disclosure is a tooth part (1B) including a tubular portion (2), an inner tooth portion (Si) formed on an inner peripheral surface of the tubular portion (2), and an outer tooth portion (So) formed on an outer peripheral surface of the tubular portion (2). The tooth part (1B) includes: a plurality of inner peripheral wall portions (2i) that each extend in an axial direction of the tubular portion (2) and form a tooth tip portion (2ti) of the inner tooth portion (Si) and a tooth bottom portion (2bo) of the outer tooth portion (So); a plurality of outer peripheral wall portions (2o) that each extend in the axial direction and form a tooth bottom portion (2bi) of the inner tooth portion (Si) and a tooth tip portion (2to) of the outer tooth portion (So); and an annular rib (2rB) that is joined to the inner peripheral wall portions (2i) and that extends radially inward from the outer peripheral wall portions (2o) in an annular shape, at an open end (2a) of the tubular portion (2).

In such a tooth part, the annular rib that is joined to the inner peripheral wall portions and extended radially inward from the outer peripheral wall portions in an annular shape is formed at the open end of the tubular portion. In this way, the rigidity of the tooth part can be increased. Further, in such a tooth part, since the thickness of the annular rib can be suppressed from being increased, the annular rib can be easily cut and the axial length of the tubular portion of the tooth part can be easily adjusted. As a result, the axial length of the tubular portion can be easily adjusted while the rigidity of the tooth part is satisfactorily ensured.

The annular rib (2rB) may be extended along the inner peripheral wall portions (2i) in an annular shape. In this way, the rigidity of the tooth part can be further improved.

Further, the tooth part (1B) may include an annular side wall (3) that extends radially inward from the other end on the opposite side of the tubular portion (2) from the open end (2a), and the outer tooth portion (So) may be an external spline to which an inner peripheral portion of a friction engagement plate of a clutch or a brake is fitted. That is, the other tooth part of the present disclosure may be configured as a clutch or brake hub.

A processing device of a tooth part of the present disclosure is a processing device (20) of a tooth part (1) including a tubular portion (2) having an inner tooth portion (Si) formed on an inner peripheral surface and an outer tooth portion (So) formed on an outer peripheral surface, a plurality of inner peripheral wall portions (2*i*) that each extend in an axial direction of the tubular portion (2) and form a tooth tip portion (2*ti*) of the inner tooth portion (Si) and a tooth bottom portion (2*bo*) of the outer tooth portion (So), a plurality of outer peripheral wall portions (2*o*) that each extend in the axial direction and form a tooth bottom portion (2*bi*) of the inner tooth portion (Si) and a tooth tip portion (2*to*) of the outer tooth portion (So), and a plurality of tooth surface portions (2*m*) that each extend in the axial direction and connect the corresponding inner peripheral wall portion (2*i*) and the corresponding outer peripheral wall portion (2*o*). The processing device includes: a plurality of dies (23) each supporting the corresponding inner peripheral wall portion (2*i*) and the corresponding outer peripheral wall portion (2*o*) from a radially outward side; a plurality of punches (25) each disposed radially inward from an open end (2*a*) of the tubular portion (2) so as to face the corresponding inner peripheral wall portion (2*i*) and the tooth surface portion (2*m*); and a driving mechanism (30) that moves the punches (25) radially outward so as to push out the corresponding inner peripheral wall portion (2*i*) and the corresponding tooth surface portion (2*m*) radially outward while shearing, while having the dies (23) support the inner peripheral wall portion (2*i*) and the outer peripheral wall portion (2*o*) from a radially outer side.

According to such a processing device, it is possible to form the annular rib at the open end of the tubular portion of the tooth part so that the annual rib is joined to the outer peripheral wall portions and extends in an annular shape on a radially outer side than the inner peripheral wall portions. Thus, it is possible to manufacture a lightweight tooth part having a high rigidity, at a low cost.

In the driving mechanism (30), the punches (25) may be moved radially outward so that an annular rib (2*r*) formed by the inner peripheral wall portions (2*i*) and the tooth surface portions (2*m*) extends along the outer peripheral wall portions (2*o*) in an annular shape.

Another processing device of a tooth part of the disclosure is a processing device of a tooth part (1B) including a tubular portion (2) having an inner tooth portion (Si) formed on an inner peripheral surface and an outer tooth portion (So) formed on an outer peripheral surface, a plurality of inner peripheral wall portions (2*i*) that each extend in an axial direction of the tubular portion (2) and form a tooth tip portion (2*ti*) of the inner tooth portion (Si) and a tooth bottom portion (2*bo*) of the outer tooth portion (So), a plurality of outer peripheral wall portions (2*o*) that each extend in the axial direction and form a tooth bottom portion (2*bi*) of the inner tooth portion (Si) and a tooth tip portion (2*to*) of the outer tooth portion (So), and a plurality of tooth surface portions (2*m*) that each extend in the axial direction and connect the corresponding inner peripheral wall portion (2*i*) and the corresponding outer peripheral wall portion (2*o*). The processing device includes: a plurality of dies that each support the corresponding inner peripheral wall portion (2*i*) and the corresponding outer peripheral wall portion (2*o*) from a radially inward side; a plurality of punches each disposed radially outward of an open end (2*a*) of the tubular portion (2) so as to face the corresponding outer peripheral wall portion (2*O*) and the corresponding tooth surface portion (2*m*); and a driving mechanism that moves the punches radially inward so as to push in the corresponding outer peripheral wall portion (2*o*) and the corresponding tooth surface portion (2*m*) radially inward while shearing, while having the dies support the inner peripheral wall portion (2*i*) and the outer peripheral wall portion (2*o*) from a radially inner side.

With to such a processing device, it is possible to form the annular rib at the open end of the tubular portion of the tooth part so that the annular rib is joined to the inner peripheral wall portions and extends radially inward from the outer peripheral walls in an annular shape. Thus, it is possible to manufacture a lightweight tooth part having a high rigidity, at a low cost.

The driving mechanism may move the punches radially inward so that an annular rib (2*r*B) formed by the outer peripheral wall portions (2*o*) and the tooth surface portions (2*m*) extends along the inner peripheral wall portions (2*i*) in an annular shape.

It should be understood that the invention of the present disclosure is not limited in any way to the above embodiment and various modifications can be made without departing from the spirit and scope of the present disclosure. Further, the embodiments described above are merely specific forms of the various aspects described in the "SUMMARY OF THE DISCLOSURE" section, and do not limit the elements described in the "SUMMARY OF THE DISCLOSURE" section.

INDUSTRIAL APPLICABILITY

The aspects of the present disclosure can be used in the manufacturing industry of tooth parts and the like.

The invention claimed is:

1. A manufacturing method of a tooth part including a tubular portion, an inner tooth portion formed on an inner peripheral surface of the tubular portion, and an outer tooth portion formed on an outer peripheral surface of the tubular portion, wherein a plurality of inner peripheral wall portions that each extend in an axial direction of the tubular portion and form a tooth tip portion of the inner tooth portion and a tooth bottom portion of the outer tooth portion, a plurality of outer peripheral wall portions that each extend in the axial direction and form a tooth bottom portion of the inner tooth portion and a tooth tip portion of the outer tooth portion, and a plurality of tooth surface portions that each extend in the axial direction and connect the corresponding inner peripheral wall portion and the corresponding outer peripheral wall portion are formed in the tubular portion, and an annular rib that extends in an annular shape on a radially outer side than the inner peripheral wall portions is formed by pushing out the inner peripheral wall portions and the tooth surface portions radially outward while shearing to separate the inner peripheral wall portions and the tooth surface portions from the tooth tip portion, at an open end of the tubular portion.

2. The manufacturing method of a tooth part according to claim 1, wherein the annular rib is formed so as to extend along the outer peripheral wall portions in an annular shape by pushing out the inner peripheral wall portions and the tooth surface portions radially outward while shearing, at the open end of the tubular portion.

3. A manufacturing method of a tooth part including a tubular portion, an inner tooth portion formed on an inner peripheral surface of the tubular portion, and an outer tooth portion formed on an outer peripheral surface of the tubular portion, wherein a plurality of inner peripheral wall portions that each extend in an axial direction of the tubular portion and form a tooth tip portion of the inner tooth portion and a tooth bottom portion of the outer tooth portion, a plurality of outer peripheral wall portions that each extend in the axial direction and form a tooth bottom portion of the inner tooth portion and a tooth tip portion of the outer tooth portion, and a plurality of tooth surface portions that each extend in the axial direction and connect the inner peripheral wall portion and the outer peripheral wall portion are formed in the tubular portion, and an annular rib that extends in an annular shape on a radially inner side than the outer peripheral wall portions is formed by pushing in the outer peripheral wall portions and the tooth surface portions radially inward while shearing to separate the outer peripheral wall portions and the tooth surface portions from the tooth tip portion, at an open end of the tubular portion.

4. The manufacturing method of a tooth part according to claim 3, wherein the annular rib is formed so as to extend along the inner peripheral wall portions in an annular shape by pushing in the inner peripheral wall portions and the tooth surface portions radially inward while shearing, at the open end of the tubular portion.

* * * * *